United States Patent [19]

Iwasaki

[11] Patent Number: 5,380,253
[45] Date of Patent: Jan. 10, 1995

[54] BICYCLE REAR DERAILLEUR

[75] Inventor: Yoshihisa Iwasaki, Osaka, Japan

[73] Assignee: Maeda Industries, Ltd., Japan

[21] Appl. No.: 146,114

[22] PCT Filed: Mar. 22, 1993

[86] PCT No.: PCT/JP93/00333
§ 371 Date: Nov. 10, 1993
§ 102(e) Date: Nov. 10, 1993

[87] PCT Pub. No.: WO93/18958
PCT Pub. Date: Sep. 30, 1993

[30] Foreign Application Priority Data

Mar. 23, 1992 [JP] Japan .................. 4-064823

[51] Int. Cl.⁶ .................................... F16H 9/00
[52] U.S. Cl. ............................................ 474/80
[58] Field of Search .......................... 474/78-82

[56] References Cited

U.S. PATENT DOCUMENTS 4,599,079 7/1986 Chappell .................. 474/80
5,152,720 10/1992 Browning et al. ......... 474/80

FOREIGN PATENT DOCUMENTS 58-23793 2/1983 Japan .
62-10874 3/1987 Japan .

Primary Examiner—Michael Powell Buiz
Attorney, Agent, or Firm—Michael D. Bednarek

[57] ABSTRACT

There is provided a bicycle rear derailleur wherein a problem that shifting the chain to a diametrically larger sprocket causes the guide pulley to come too close to the sprocket, which is an inherent problem to a conventional bicycle rear derailleur using a double tension mechanism, is rationally solved with further improved speed change efficiency. This rear derailleur comprises a rearwardly extending control mechanism (23) pivotally supported at a front end portion thereof to a bicycle frame (22) ahead of the multiple sprocket assembly, the control mechanism mounted at a rear end portion thereof with a chain guide (25) rotatably supporting a guide pulley (39) and a tension pulley (40), wherein the control mechanism is urged against the bicycle frame in a clockwise direction about a first lateral shaft (34), and the chain guide is urged against a chain guide mount of the control mechanism in a clockwise direction about a second lateral shaft (41).

6 Claims, 5 Drawing Sheets

Fig. 6  PRIOR ART
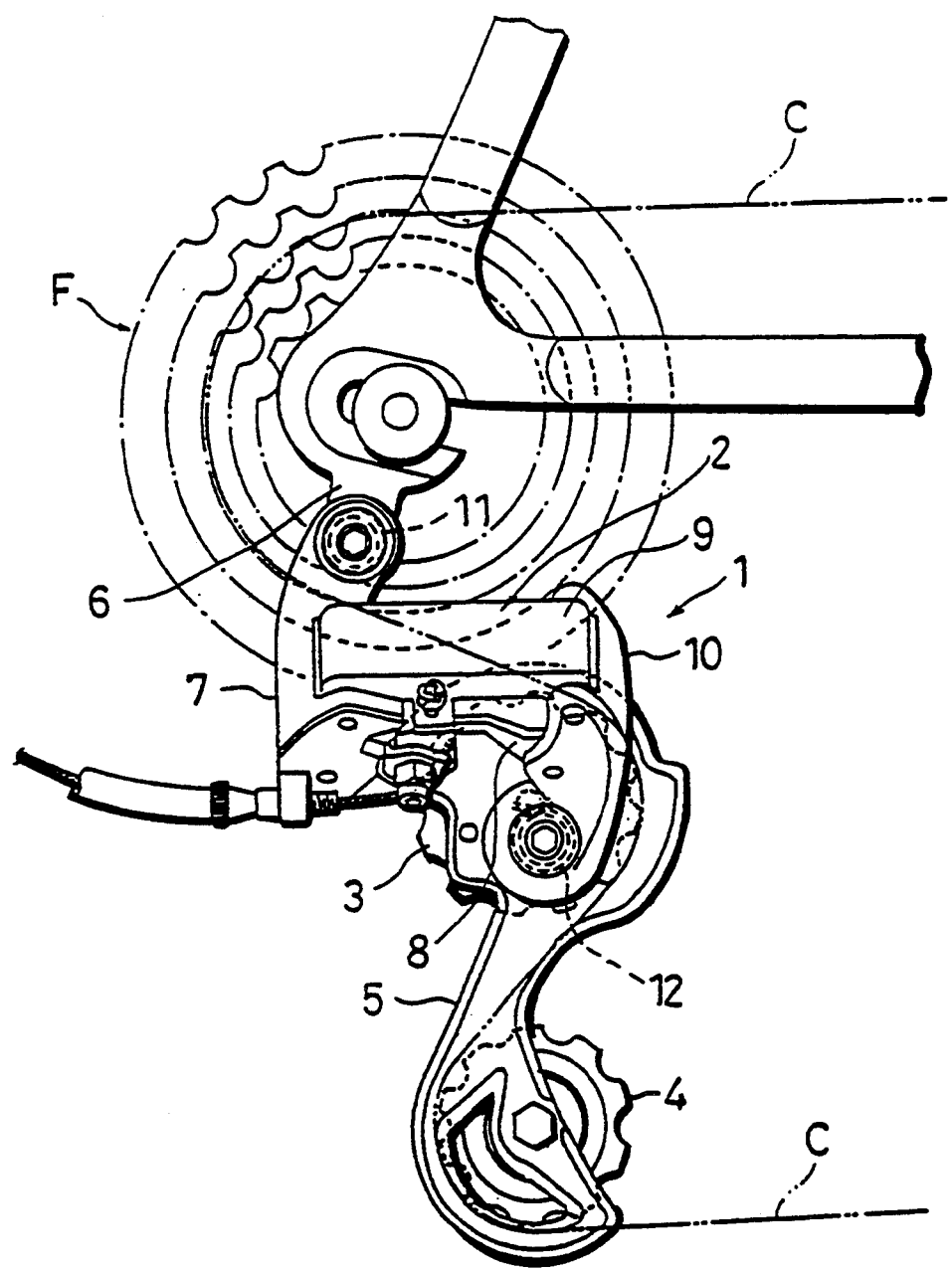

BICYCLE REAR DERAILLEUR

FIELD OF THE INVENTION

The present invention relates to a bicycle rear derailleur for shifting a chain onto a desired sprocket of a bicycle free wheel (rear gear) assembled as a multiple sprocket comprising a plurality of diametrically different sprockets, and more specifically, relates to one wherein a distance between a guide pulley of the chain guide and each sprocket of the multiple sprocket assembly can be set at an appropriate distance for improved speed change performance.

BACKGROUND ART

FIG. 6 shows a typical conventional bicycle rear derailleur.

This bicycle rear derailleur 1 is arranged so that by using a control mechanism such as a pantograph link mechanism 2, a chain guide 5 having a guide pulley 3 and a tension pulley 4 can be moved axially of a shaft of a multiple sprocket F.

The pantograph link mechanism 2 has a link base 7 to attach to an end plate 6, for example, of a bicycle frame, a forwardly extending pair of inner and outer link members 8, 9, each pivoted at a base end thereof to the link base 7 so as to move laterally of the bicycle, and a movable member 10 pivoted to respective free ends of the inner and outer link members 8, 9. Each of the constituent members 7, 8, 9, 10 of this pantograph link mechanism 2 are arranged and pivoted in a shape of deformable parallelogram, so that when the pantograph link mechanism 2 is deformed, the movable member 10 is translated laterally of the bicycle.

Since the chain guide 5 is mounted to the movable member 10, it is also translated laterally of the bicycle with the movable member 10 as the pantograph link mechanism 2 deforms.

While the bicycle is running, a chain C runs on a rear side of the tension pulley 4, a front side of the guide pulley 3, and then, a rear side of a sprocket of the multiple sprocket F. Therefore, when the guide pulley 3, which supports a portion of the chain immediately before engaging the multiple sprocket F, is moved axially of the multiple sprocket F as described earlier, the chain C is shifted onto another sprocket which positionally corresponds to the moved guide pulley 3.

As described hereinabove, in the bicycle derailleur, the guide pulley 3 is directly responsible for shifting the chain C, and in order to improve shifting response of the chain C, it is necessary for this guide pulley 3 to be positioned at an appropriate distance, not too close to or too far away, from the multiple sprocket F.

Each of the sprockets constituting the multiple sprocket F is arranged so that a diametrically smallest sprocket is placed at a laterally outermost position, and a diametrically larger one is placed more inward laterally of the bicycle. In an attempt to position the guide pulley 3 at an appropriate distance from each of these diametrically different sprockets, a number of proposals have been made conventionally.

One of these is disclosed in the Japanese Patent Publication Sho 42-23486, wherein pivot pins which link the constituent members of the pantograph link mechanism are slanted inward laterally of the bicycle. This is commonly known as the slant pantograph link mechanism. With this arrangement, when the pantograph link mechanism is deformed to move the chain guide inward laterally of the bicycle, the chain guide moves with inclination, or downwardly as well as inwardly. Since this inclination corresponds to an inclination of a line provided by connecting the outer edges of respective sprockets of the multiple sprocket, it is possible to reduce variation in the distance between the guide pulley and respective corresponding sprockets.

There is a problem however: Since the moving direction of the movable member of pantograph link mechanism is fixed, there is no adaptability to different sprocket configurations, for example, when the multiple sprocket is replaced from what is known as a close-ratio type to a wide-ratio type, or in other words, from a sprocket configuration wherein a gear teeth ratio between sprockets is small to another configuration wherein the same is large.

In an attempt to solve this problem, the Japanese Patent Publication Sho 62-10874 discloses an invention, wherein the slant angle of pantograph link mechanism is set for an interchangeable multiple sprocket of the widest possible ratio whereas the link mechanism is pivotally mounted to the bicycle frame, being urged in a direction to tension the chain. This mechanism, in which the link mechanism is pivotally mounted to the bicycle frame and is urged, is referred to as the double tension mechanism since the chain guide pivoted on the link mechanism is also urged, as a matter of course, in a direction to tension the chain.

Hence, the bicycle rear derailleur disclosed in the Japanese Patent Publication Sho 62-10874 is a combination of a slant pantograph link mechanism and a double tension mechanism, wherein the slant angle for the pantograph link mechanism is set to correspond to a multiple sprocket of the widest possible ratio.

The above Patent Publication describes that in a rear derailleur arranged as above, when the chain is shifted from a diametrically smaller sprocket to a diametrically larger sprocket, the pantograph link mechanism deforms to move the guide pulley away from the multiple sprocket; however, a spring which urges the link mechanism is compressed to pivotally move the link mechanism counterclockwise to adjust the position of the guide pulley closer to the sprocket, thereby maintaining a constant distance between the guide pulley and each sprocket regardless of the configuration of the multiple sprocket.

However, there are still the following problems with this particular bicycle derailleur disclosed in the Japanese Patent Publication Sho 62-10874:

First, when the slant angle of the pantograph link mechanism is set to have an inclination which corresponds to the case wherein the multiple sprocket has a sprocket configuration of the widest possible gear ratio, a considerably large stroke must be allowed for the movable member. Hence, the link mechanism needs to be increased in size. In addition, the link mechanism must be deformed substantially, resulting in a deteriorated operation efficiency to deform the link mechanism.

Second, use of the double tension mechanism inherently poses a problem that as the chain is shifted onto a diametrically larger sprocket, the guide pulley tends to come too close to that diametrically larger sprocket. This tendency is more intense as the multiple sprocket is of a wider ratio. Practically therefore, on a multiple sprocket of a wide ratio, chain shifting efficiency is not so good when the chain is shifted to a diametrically larger sprocket.

This inherent problem in the conventional double tension mechanism will now be elaborated referring to FIG. 6.

As shown in FIG. 6, the link mechanism 2 extends forwardly from the link base 7 which is the base end side; free ends thereof supports the movable member 10 which supports the chain guide 5. This link mechanism 2 is urged by a spring 11 for tensioning the chain C in a clockwise direction, or in other words in a direction for the guide pulley 3 to move away from the multiple sprocket F.

In the link mechanism arranged as hereinabove, as the chain C is shifted onto a diametrically larger sprocket, chain becomes less tense and therefore, the tension pulley 4 is pulled forwardly to move the chain guide 5 in a counterclockwise direction. In this case, the chain guide 5 being urged by the spring 12 compresses this spring as it moves.

However, when the chain guide 5 is moved counterclockwise compressing the spring 12, one effect is that the link mechanism 2 is moved counterclockwise to compress a spring 11 which urges the link mechanism. In other words, as the chain C is moved to a diametrically larger sprocket, the guide pulley comes closer to the sprocket. This tendency is more significant in the multiple sprocket having a wider gear ratio. As a result, it becomes likely that the chain guide 5 or the movable member 10 interferes with the diametrically larger sprocket to hinder speed change operation.

Therefore, in order to solve this problem, the slant angle has to be large, or the distance between the guide pulley and a diametrically smaller sprocket has to be wide enough to allow for clearance between the guide pulley and a diametrically larger sprocket.

DISCLOSURE OF THE INVENTION

It is therefore an object of the present invention to rationally solve the inherent tendency of a conventional bicycle rear derailleur which uses the double tension mechanism wherein shifting the chain to a diametrically larger sprocket causes the guide pulley to come too close to the sprocket.

Another object of the present invention is to provide a bicycle rear derailleur wherein variation in the distance from the guide pulley to respective engaging sprockets can be reduced between a case wherein the guide pulley corresponds to a diametrically smaller sprocket of the multiple sprocket and another case wherein the guide pulley corresponds to a diametrically larger sprocket of the multiple sprocket for improved speed change performance.

The present invention according to claim 1 is a bicycle rear derailleur for shifting a chain onto a desired sprocket of a multiple sprocket assembly having a plurality of diametrically different sprockets, comprising:

a rearwardly extending control mechanism attached at a front end portion thereof to a bicycle frame ahead of the multiple sprocket assembly, the control mechanism having at a rear end portion thereof a chain guide mount which shifts in position laterally of the bicycle by operation of the control mechanism; and a chain guide mounted to the chain guide mount, the chain guide having an upper guide pulley and a lower tension pulley, wherein the control mechanism is mounted to the bicycle frame to be pivotal about a first lateral shaft under a clockwise bias, and the chain guide is mounted to the chain guide mount to be pivotal about a second lateral shaft under a clockwise bias.

Other objects, characteristics and advantages of the present invention will become obvious from the following description of the preferred embodiment to be made referring to the attached Figures.

BRIEF DESCRIPTION OF THE DRAWINGS

FIG. 6 is a view to show a convention.

BEST MODE FOR CARRYING OUT THE INVENTION

Now, a preferred embodiment of the present invention, the bicycle rear derailleur 21 will be described in more specific detail referring to the Figures.

Figure 1:
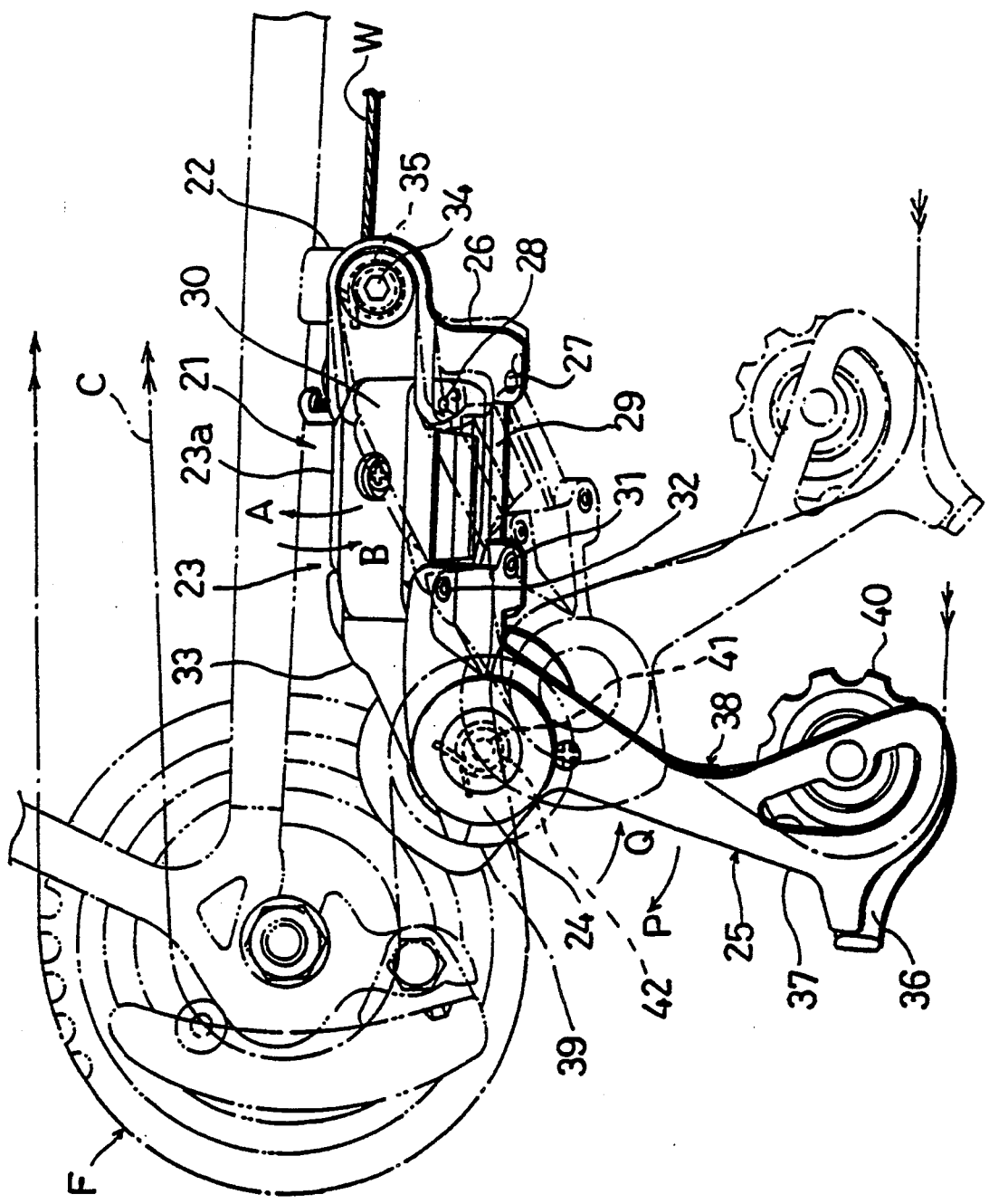
FIG. 1 is a front view (as viewed from the right side of a bicycle.) of an embodiment of the present invention.

As shown in FIG. 1, this bicycle rear derailleur 21 comprises a rearwardly extending control mechanism 23 attached at a front end portion thereof to a bicycle frame 22 ahead of a multiple sprocket wheel F, and a chain guide 25 mounted to a mounting portion 24 provided at a rear end portion of the control mechanism 23.

The control mechanism 23 is operated so that the position of the chain guide 25 can be shifted laterally of the bicycle, and in the present embodiment, is constituted as a parallelogram pantograph link mechanism 23a.

This pantograph link mechanism 23a includes a link base 26 attached to the frame 22, a pair of inner and outer link members 29, 30 connected at their respective base ends by pins 27, 28 for pivoting laterally of the bicycle, and a movable member 33 pivoted to each rear end of the link members 29, 30 by pins 31, 32. Each of the pins 27, 28, 31, 32 is arranged to provide a vertex of the parallelogram, so that when this parallelogram pantograph mechanism 23a is deformed, the movable member 33, or the chain guide 25 mounted thereon, translates laterally of the bicycle.

The bicycle rear derailleur according to the present embodiment is common with conventional bicycle rear derailleurs in that the chain guide 25 having a guide pulley 39 and tension pulley 40 each engaged by a chain is moved laterally of the bicycle, or axially of the multiple sprocket shaft, by means of the link mechanism 23a to perform speed change; differing completely, however, from common conventional rear derailleurs in the mode wherein the link mechanism 23a is attached to the bicycle frame.

To elaborate on this, in the conventional rear derailleur, the control mechanism typically constituted by a pantograph link mechanism was extended forwardly, being connected at a rear end portion thereof to the bicycle frame, and the chain guide was mounted at a front end portion of the control mechanism. In the present embodiment, contrary to the convention, the control mechanism extends rearwardly from ahead of the multiple sprocket where it is mounted on the bicycle frame, and the chain guide 25 is mounted at a rear end portion of the control mechanism.

The parallelogram pantograph link mechanism 23a is pivotally supported at its front base end portion, or in other words, at the link base 26, to the frame 22 so as to pivot within a predetermined range of angle about a first lateral shaft 34 which is parallel to the axis of the multiple sprocket F, being elastically urged in a clockwise direction (Arrow A) by a first spring 35 provided within the link base 26.

On the other hand, the chain guide 25 includes an inner plate 36 and an outer plate 37 which constitute a guide frame 38, which rotatably supports, at an upper portion thereof, a guide pulley 39, and at a lower portion thereof, a tension pulley 40. The chain guide 25 is pivotally supported on a second lateral shaft 41 which is in parallel to the first lateral shaft 34. Further, this chain guide 25 is urged in a clockwise direction (Arrow P) by a second spring 42 provided around the second lateral shaft 41 within the movable member 33.

Figure 2:
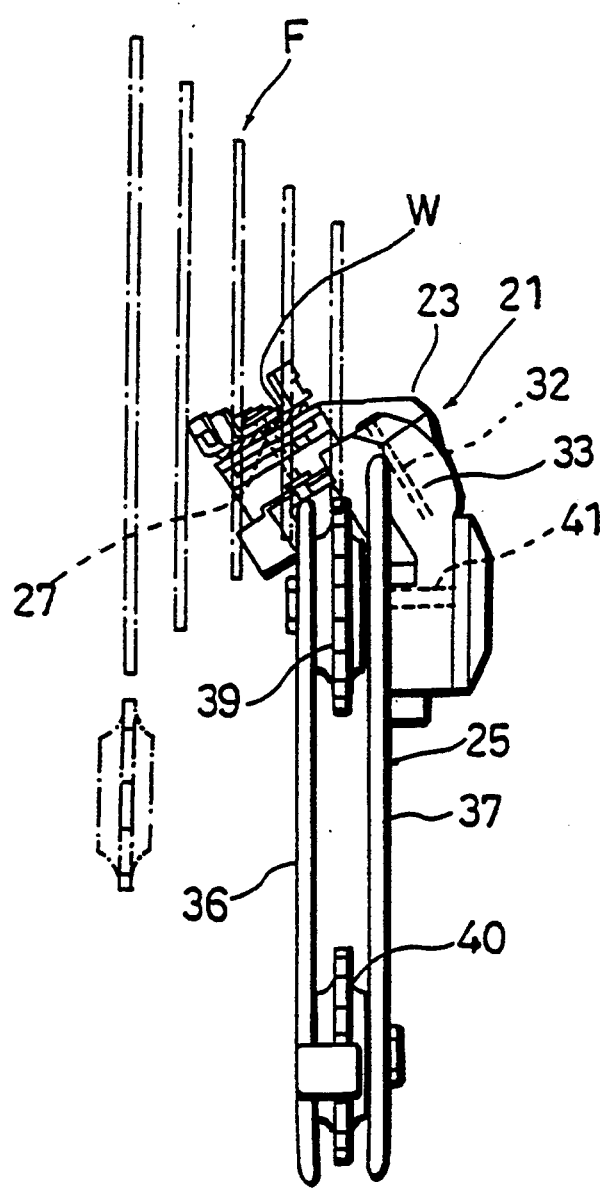
FIG. 2 is a left side view (as viewed from the rear of the bicycle) of the same.
Figure 3:
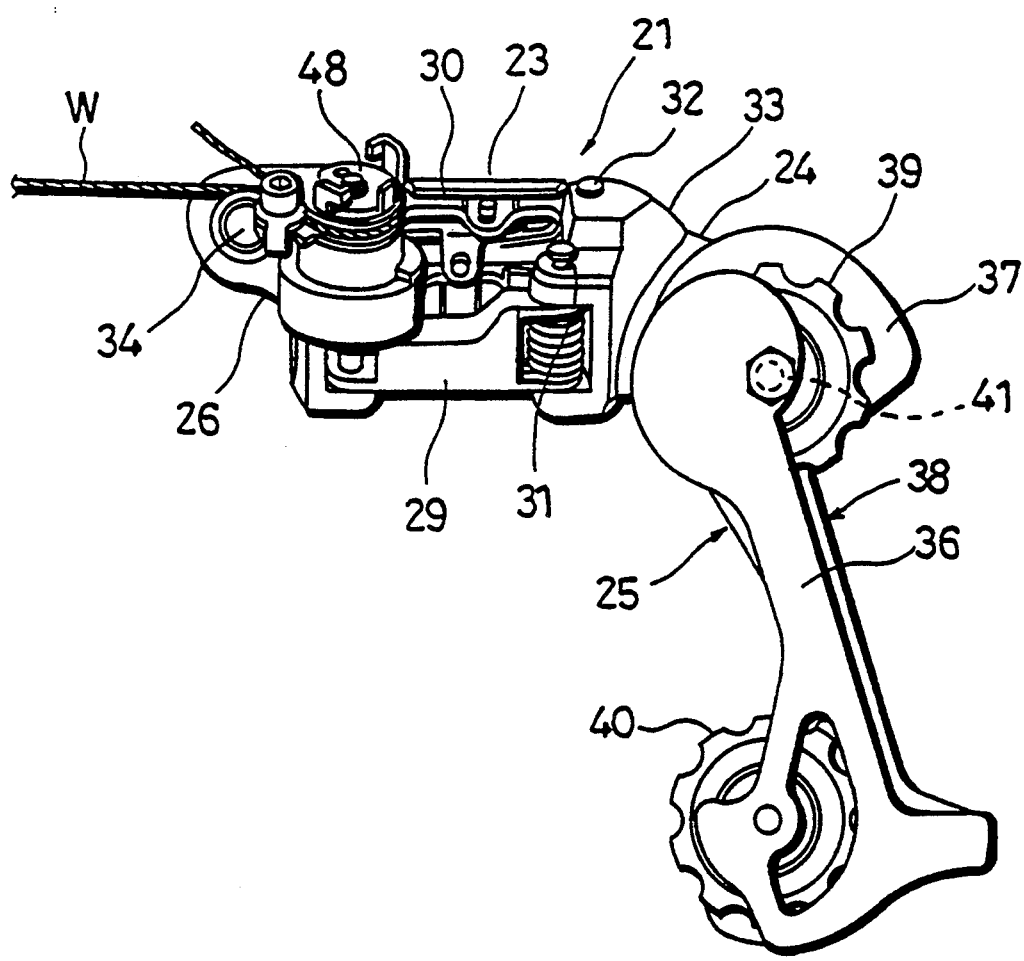
FIG. 3 is a rear view (as viewed from the left side of the bicycle) of the same.
Figure 4:
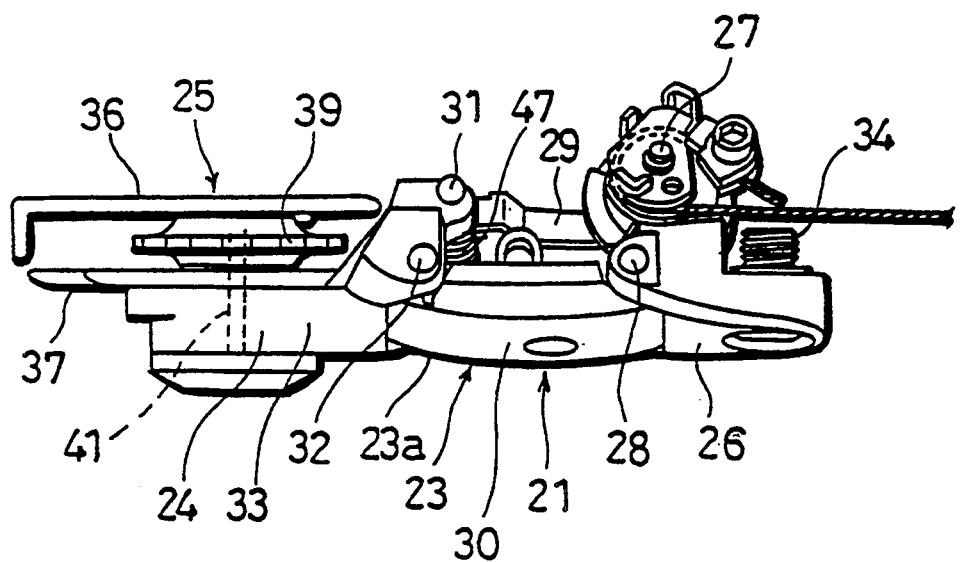
FIG. 4 is a plan view of the same.

In the parallelogram pantograph link mechanism 23a specifically in this embodiment, the four pins 27, 28, 31 and 32 which pivotally link together the four constituent members are slanted inward laterally of the bicycle as clearly shown in FIG. 2. With this arrangement, when the link mechanism 23a is deformed for moving the chain guide 25 from a diametrically smaller sprocket (from outside laterally of the bicycle) to a diametrically larger sprocket (to inward laterally of the bicycle), the chain guide 25 is caused to move inward axially of the bicycle and at the same time downwardly.

The bicycle rear derailleur 21 arranged and mounted to a bicycle frame as described hereinabove is set to stabilize as shown in FIG. 1 when an endless chain C engages the tension pulley 40 from behind, the guide pulley 39 from ahead, and then one of the sprockets of the multiple sprocket F from behind.

Figure 5:
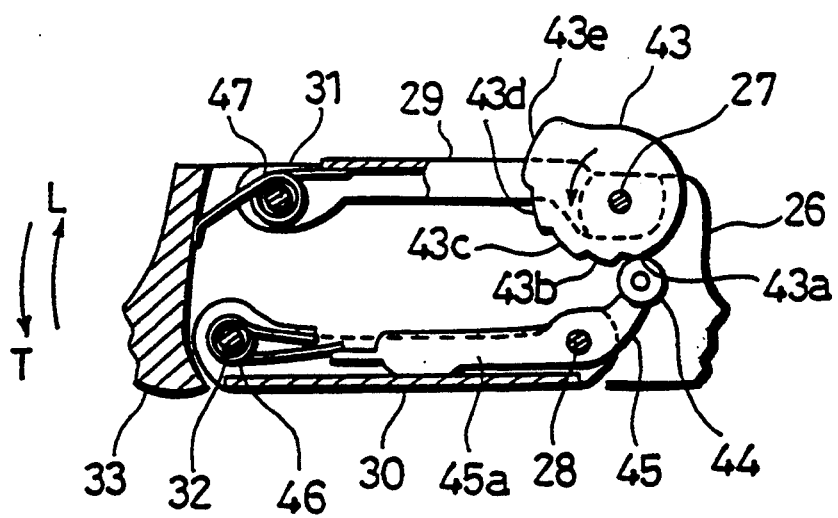
FIG. 5 is a view of a cut model to show the constitution for deforming the pantograph link mechanism according to the above embodiment.

When the parallelogram pantograph link mechanism 23a is deformed to laterally shift the chain guide 25, the chain C is moved onto a sprocket which corresponds to the shifted position. This deformation of the link mechanism 23a is performed usually by operating a shift lever (unillustrated) mounted to a predetermined position of the bicycle frame; the operational force is transmitted by a wire W to the link mechanism 23a. In the present embodiment this is arranged as follows:

As elaborately shown in FIG. 5, the link base 26 is provided at a predetermined position thereof with a rotary cam 43 having peripheral cam face 43a, or 43b . . . wherein their radial distance from the center is gradually varied in a stepped manner. A cam follower 44, which is urged to elastically contact the cam faces 43a, 43b . . . is provided. In the present embodiment, an arm 45 for supporting the cam follower 44 is pivotally mounted to the pin 28 which connects the link base 26 and the outer link member 30. This arm 45 further extends along an inner surface of the outer link member 30 to form an arm extension 45a, which is urged to constantly press the inner surface of the outer link member 30 by a spring 46 provided around the pin 32 which connects the outer link member 30 and the movable member 33. Further, a return spring 47 provided around the pin 31 which connects the inner link member 29 and the movable member 33 urges the link mechanism 23 in its entirety by causing the movable member 33 to tend to return toward a diametrically smaller sprocket of the multiple sprocket F (outward laterally of the bicycle). The elastic force of this return spring 47 is set to be smaller than the elastic force of the spring 46 which presses the arm 45 to the outer link member 30.

In a normal condition, elastic force of the return spring 47 causes the movable member 33 to tend to return outward laterally of the bicycle, thereby pressing the cam follower 44 onto the peripheral cam faces 43a, 43b . . . .

When the cam is rotated to press the cam follower 44 to move away from the center of cam's rotation, the greater elastic force of the spring 46 than the elastic force of the return spring 47 causes the arm 45 and outer link member 30 to pivotally move together in the direction shown by Arrow L in FIG. 5, deforming the entire link mechanism 23a to shift the movable member 33, or the chain guide 25, in Direction L with the return spring 47 accumulating elastic force.

When the cam 43 is rotated in the other direction, the cam follower is contacted by a peripheral cam surface of a smaller radius, allowing the arm 45 to pivotally move in Direction T. Hence, the link mechanism 23a is moved back by the return spring 47 by an amount regulated by the cam 43, causing the movable member 33, or the chain guide 25, to shift in Direction T.

The arrangement shown in FIG. 5 also functions as what is known as the pre-loading mechanism. In other words, while the chain C is not in motion, for instance, preventing the movable member 33, or the chain guide 25, from moving laterally of the bicycle, it is still possible to rotate the cam 43 for pivotally moving the arm 45. In this case, the arm extension 45 relatively moves away from the outer link member 30 to compress the spring 46. When the force preventing the movable member 33 from moving is removed, or when the chain begins to be in motion, the spring 46 presses the arm extension 45a of the arm 45 onto the outer link member 30. Since the outer link member 30 is pressed onto the arm extension 45a which has already been rotated in relation to the link base, the link mechanism 23a is now deformed to cause the movable member 33 to move in Direction L. It should be appreciated to note here that such a deformation is possible because the elastic force which presses the arm extension 45a is greater than the elastic force of the return spring 47.

In order to rotate the rotary cam 43, the rotary cam 43 itself is urged by an unillustrated spring to return in one rotational direction, and in addition, the cam 43 is integrally provided with a reel 48 to which the wire W coming from the shift lever (unillustrated) is connected. With this arrangement, it becomes possible that by operating the unillustrated shift lever in one direction to pull the wire W, the cam 43 can be forcedly rotated in one direction, whereas by operating the shift lever in reverse direction to release the wire W, the cam 43 can be rotated back by the elastic force of the spring that urges the cam.

It is a matter of course that the arrangement for deforming the link mechanism 23a by pulling or releasing a cable is not limited to what is described hereinabove; no problem arises from employing a method used in conventional rear derailleurs wherein an outer sheath and an inner wire are connected respectively to two of the four constituent members of the link mechanism which shift their relative position to each other, so that axial relative movement between the outer sheath and the inner wire generated by the shift lever causes the link mechanism to deform. The wire may also be connected directly to the movable member 33 of the link mechanism 23a.

With the arrangement described hereinabove, consideration will now be made for a case wherein the chain C is shifted from a diametrically smaller sprocket to a diametrically larger sprocket.

Referring to FIG. 1, when the link mechanism 23a is deformed to move the chain guide 25 laterally of the bicycle, the chain C is shifted to a diametrically larger sprocket which corresponds to the shifted position of the guide pulley 39 of the chain guide 25. Since the chain's slackness becomes accordingly smaller now, the chain guide 25, being pulled at the tension pulley 40 in a forward direction, pivots around the second lateral shaft 41 in Direction Q, compressing the second spring 42 which urges the chain guide 25 in Direction P. This increase in elastic force in the second spring 42 is balanced by the pivotal movement of the link mechanism 23a around the first lateral shaft 34 in Direction B, compressing the first spring 35 which urges the link mechanism 23a in Direction A (See drawing in phantom lines, FIG. 1). In other words, the effect of the counterclockwise movement of the chain guide 25 caused by the reduced slackness in the chain appears as a counterclockwise movement of the control mechanism.

As a result, the position of the guide pulley 39 moves downwardly by a distance corresponding to the pivotal movement of the link mechanism 23a in Direction B. The counterclockwise movement of the link mechanism 23a on the first lateral shaft 34 means that the guide pulley 39 of the chain guide 25 pivotally moves away from the axis of the multiple sprocket by a predetermined amount. In addition, of course, since the link mechanism 23a used in the present embodiment is of a type commonly known as the slant pantograph link, there is an additional positional change resulting from the slant angle.

Hence, in the bicycle rear derailleur according to the present embodiment, the position of the guide pulley 39, which directly affects chain shifting operation, is automatically adjusted to a relevant position with the outer diameter of the sprockets of the multiple sprocket. Resultingly, regardless of the sprocket configuration of the multiple sprocket, the guide pulley 39 is located at an appropriate position according to the diameter of a corresponding sprocket.

It should be clearly noted here that the downward displacement in the position of the guide pulley 39 varies in proportion to the decrease in slackness of the chain C, in correspondence to the diameter of the sprocket engaged by the chain C; the greater the sprocket's diameter is, the more downwardly is the position of the guide pulley 39 automatically adjusted.

This makes a striking contrast with the fact that in the conventional double tension rear derailleur, as the chain is shifted to a diametrically larger sprocket, the guide pulley moves closer to the sprocket.

To elaborate on this, in the conventional double tension mechanism, the guide pulley moves closer as the chain moves onto a diametrically larger sprocket; therefore, when a multiple sprocket is replaced with another multiple sprocket having a substantially different sprocket configuration, extremely difficult and complicated adjustment was necessary. In the present invention, on the other hand, the guide pulley automatically moves toward and away from the multiple sprocket axis corresponding to the size of a sprocket engaged by the chain.

Therefore, regardless of the sprocket configuration of the multiple sprocket, it is possible to maintain the distance between the guide pulley and the multiple sprocket within a predetermined tolerance range.

Thus, in a rear derailleur according to the present invention, an appropriate guide pulley position is automatically selected corresponding to the change in sprocket, making it possible to rationally keep the distance between the guide pulley and each sprocket within an appropriate range regardless of the sprocket configuration, thereby maintaining appropriate speed change performance regardless of the sprocket configuration of the multiple sprocket to be used with.

The present invention is of course not limited to the embodiment described hereinabove.

For instance, the chain guide 25 used in the embodiment, which is known as the pendulum type chain guide, may of course be of other known types such as the balance type or the triangle balance type chain guide.

Similarly, a parallelogram pantograph link mechanism is used in the embodiment as the control mechanism to move the chain guide 25 laterally of the bicycle. However, the control mechanism is of course not limited to be such a pantograph link mechanism.

For example, the chain guide may be slidably moved along a lateral shaft, or there may be an arrangement wherein a base member attached to the bicycle frame supports a rearwardly extending pivotal member having a base end pivoted to the base member, and a free end of the pivotal member pivotally supports the chain guide.

Further, in the embodiment, the parallelogram pantograph link mechanism 23a is of the slant type; however, whether to use the slant type or not is optional, although using the slant type further increases the function and effect of the present invention.

Furthermore, as already described earlier, the constitution for deforming the link mechanism 23a may not include a cam though it is used in the embodiment.

Still further, as described hereinabove, the positional adjustment of the guide pulley 39 corresponding to the diameter of the sprocket engaged by the chain requires a pre-requisite that the first spring which urges the link mechanism 23a and the second spring which urges the chain guide are in equilibrium; however, the first and second springs may not always be in equilibrium.

For example, it is of course within the scope of the present invention that the link mechanism is urged in Direction A with the pivoting range of the link mechanism 23a being regulated so that the horizontal state shown in FIG. 1 is the extreme case of the pivotal movement in Direction A.

With this particular arrangement, when the chain engages a sprocket of a relatively small diameter, the link mechanism 23a is contacted by an edge of the pivotal movement range, making the first spring practically inactive, and the chain is tensioned solely by the second spring which urges the chain guide. On the other hand, when the chain engages a sprocket of a relatively large diameter, decrease in chain slackness causes the chain guide to move substantially in Direction Q, bringing the first and second springs into equilibrium to cause the link mechanism 23a to pivotally move about the first lateral shaft in Direction B by a predetermined amount.

Still further, the position and method of mounting the rear derailleur to the bicycle frame is not limited to the embodiment; for example, it is possible to mount directly to a chain stay of a bicycle frame, or to mount indirectly using a bracket and the like.

I claim:

1. A bicycle rear derailleur for shifting a chain onto a desired sprocket of a multiple sprocket assembly having a plurality of diametrically different sprockets, comprising:

a rearwardly extending control mechanism attached at a front end portion thereof to a bicycle frame ahead of the multiple sprocket assembly, the control mechanism having at a rear end portion thereof a chain guide mount which shifts in position laterally of the bicycle by operation of the control mechanism; and a chain guide mounted to the chain guide mount, the chain guide having an upper guide pulley and a lower tension pulley, wherein the control mechanism is mounted to the bicycle frame to be pivotal about a first lateral shaft under a clockwise bias, and the chain guide is mounted to the chain guide mount to be pivotal about a second lateral shaft under a clockwise bias.

2. The bicycle rear derailleur according to claim 1, wherein the control mechanism is a link mechanism comprising: a link base providing the front end portion of the control mechanism; a pair of inner and outer link members each pivoted at a base end thereof to the link base by a pin; and a movable member pivoted by a pin to a free end of each link member.

3. The bicycle rear derailleur according to claim 2, wherein the pins for connecting the constituent members of the link mechanism are slanted laterally of the bicycle.

4. The bicycle rear derailleur according to claim 1, wherein the control mechanism comprises a base member providing the front end portion of the control mechanism, and a rearwardly extending pivotal member having a base end pivoted to the base member by a pin, a free end of the pivotal member providing the chain guide mount.

5. The bicycle rear derailleur according to claim 1, wherein a rotational axis of the guide pulley is offset from the second lateral shaft which pivotally supports the chain guide.

6. The bicycle rear derailleur according to claim 2, wherein the pins for connecting the constituent members of the link mechanism are slanted laterally of the bicycle, and a rotational axis of the guide pulley is offset from the second lateral shaft which pivotally supports the chain guide.

* * * * *